(12) United States Patent
Parlee et al.

(10) Patent No.: US 6,741,439 B2
(45) Date of Patent: May 25, 2004

(54) PHASE COUPLER

(75) Inventors: Brad E. Parlee, Fern Park, FL (US); Jeffrey A. Goodman, West Hartford, CT (US)

(73) Assignee: General Electric Company, Schenectady, NY (US)

(*) Notice: Subject to any disclaimer, the term of this patent is extended or adjusted under 35 U.S.C. 154(b) by 13 days.

(21) Appl. No.: 09/683,152

(22) Filed: Nov. 27, 2001

(65) Prior Publication Data

US 2003/0099078 A1 May 29, 2003

(51) Int. Cl.$^7$ ................................................ H02H 1/00
(52) U.S. Cl. ...................................................... 361/119
(58) Field of Search ................................ 361/110, 111, 361/119, 126, 127; 340/310.01, 310.03, 310.05, 310.06, 310.07, 310.08

(56) References Cited

U.S. PATENT DOCUMENTS

| | | | |
|---|---|---|---|
| 4,630,163 A | * 12/1986 | Cooper et al. | 361/56 |
| 5,412,526 A | 5/1995 | Kapp et al. | 361/56 |
| 5,625,863 A | * 4/1997 | Abraham | 725/79 |
| 5,825,598 A | * 10/1998 | Dickens et al. | 361/42 |
| 6,078,299 A | 6/2000 | Scharfe, Jr. | 343/858 |

* cited by examiner

*Primary Examiner*—Ronald W. Leja
(74) *Attorney, Agent, or Firm*—Cantor Colburn LLP

(57) ABSTRACT

A phase coupler for operable communication between at least two phases of an electrical distribution system while maintaining power isolation between the phases comprising: a capacitive circuit connected to the at least two phases and configured to transfer a signal having a predetermined frequency or frequency range from a first phase to a second phase; a first terminal in operable communication with the circuit and the first phase; a second terminal in operable communication with the circuit and the second phase; a third terminal in operable communication with the circuit and a neutral line of the electrical system; and a housing configured to house said circuit and provide for operable electrical connection between said first, second and third terminals and an outside conductor.

14 Claims, 6 Drawing Sheets

PHASE COUPLER

BACKGROUND OF INVENTION

Home automation is a catchall phrase for "smart" low voltage and high voltage electrical appliances in a home. In its simplest form, it may be an outdoor light with a motion detector. In a more complex form, it may be a totally integrated home electrical, security, and entertainment management system including centralized audio/video wiring and distribution; "advanced" phone and computer LAN wiring and systems; security systems; smart HVAC systems; and automated lighting and other automated appliances.

Many different powerline protocols have been used for home automation lighting and device/appliance control. These protocols communicate between transmitters and receivers by sending and receiving signals over existing power line wiring that are used to power the devices. More specifically, these protocols use signals via 110/120 volt, 60 cycle, electrical wiring to transport messages between devices connected to the wiring for receiving electrical power. Most homes have three wires that feed the electrical system from an electrical panel or load center. Two of the three wires each include a hot (110/120 volt leg), and the third is a neutral line. Both 110/120 volt legs together with a neutral line provide a 220/240 volt source to power 220/240 volt appliances such as a dryer or an oven. Each of the 110/120 volt legs power items such as lights and outlet plugs via one of the two hot 110/120 volt legs and the neutral line. Because most homes are wired such that 220/240 volt potential is brought into the breaker panel and then split into two phases of 110/120 volts each, the signals from one device are transmitted onto one phase and have to travel all the way out to the pole transformer (utility company transformer) to couple across to the other phase. The amplitude of the signal on the other phase may therefore be greatly reduced due to signal attenuation. In other words, the two 110/120 volt legs are only connected at the transformer outside of the home. However, sometimes the distance that the signal must travel from one 110/120 volt leg to the utility transformer back to the home via the second 110/120 volt leg is too great and the signal attenuated.

Current approaches to couple both 110/120 volt legs use a phase coupler that resides inside of the electrical distribution panel but requires special wiring into the panel through the lugs of a circuit breaker. This solution is not easily done by the average homeowner and usually necessitates an electrician to connect the phase coupler. In addition, many of the circuit breakers used for connecting the phase coupler are not designed for multiple conductors or are not sized to protect the phase coupler, thus the phase coupler is not UL compliant and does not conform to the National Electric Code (NEC).

Accordingly, it would be desirable and advantageous to provide an apparatus for allowing signal communication between two 110/120 volt legs that is low in cost, both for manufacture and installation, and which eliminates a need for an experienced electrician to couple the two phases for signal communication therebetween while maintaining the AC power isolation between them. It is also desirable that such an apparatus be UL compliant and conforms to the National Electric Code upon installation.

SUMMARY OF INVENTION

The above discussed and other drawbacks and deficiencies are overcome or alleviated by a phase coupler for operable communication between at least two phases of an electrical distribution system while maintaining power isolation between the phases comprising: a band pass filter circuit connected to the at least two phases and configured to transfer a signal having a predetermined frequency or frequency range from a first phase to a second phase; a first terminal in operable communication with the circuit and the first phase; a second terminal in operable communication with the circuit and the second phase; a third terminal in operable communication with the circuit and a neutral line of the electrical system; and a housing configured to enclose said circuit and provide for operable electrical connection between said first, second and third terminals and corresponding outside conductors.

BRIEF DESCRIPTION OF DRAWINGS

Referring now to the drawings wherein like elements are numbered alike in the several Figures.

DETAILED DESCRIPTION

Figure 1:
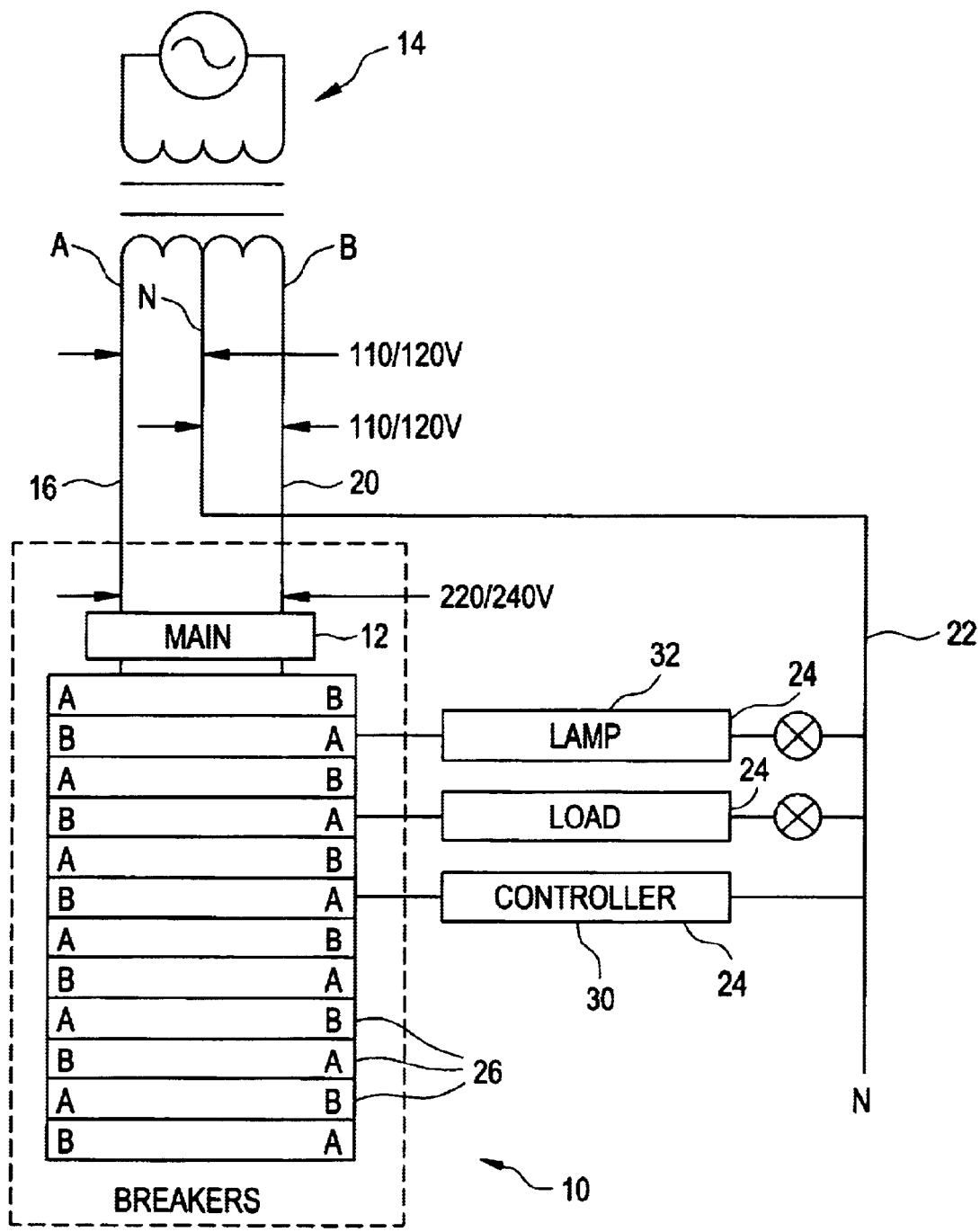
FIG. 1 is a schematic diagram of a conventional home automation system using one phase of two isolated AC power lines entering an electrical panel for signal transmission and reception.

A residential load center 10 is shown in FIG. 1, and connects through a main circuit breaker 12 with a utility distribution transformer 14 by means of main conductors 16, 20, as indicated. A separate neutral conductor 22 connects with each of a number of the distributed loads 24 through separate branch circuit breakers 26. Certain selected branch circuit breakers 26, designated A and B are connected to one of the two main conductors 16, 20 or phases A and B, respectively. More specifically, a branch circuit breaker 26 designated with an "A" indicates connection with main conductor 16 or phase A having a potential of 110/120 V with neutral conductor 22. A branch circuit breaker 26 designated with a "B" indicates connection with main conductor 20 or phase B having a potential of 110/120 V with neutral conductor 22.

A controller 30 may be associated with one of the loads 24 or may be a separate device to operate other loads 24 or communicate with other controllers 30. A first controller 30, as shown, is connected with phase A and may operably communicate with other loads 24 with a second controller 30, such as to control a lamp 32, through phase A with little or no signal attenuation. Controller 30 may also operably communicate with other controllers 30 and loads 24 associated with phase B, but typically results in signal attenuation because of the length of signal transmission from phase A, to the utility pole transformer 14, through phase B and to the load 24 that is desired to control.

Figure 2:
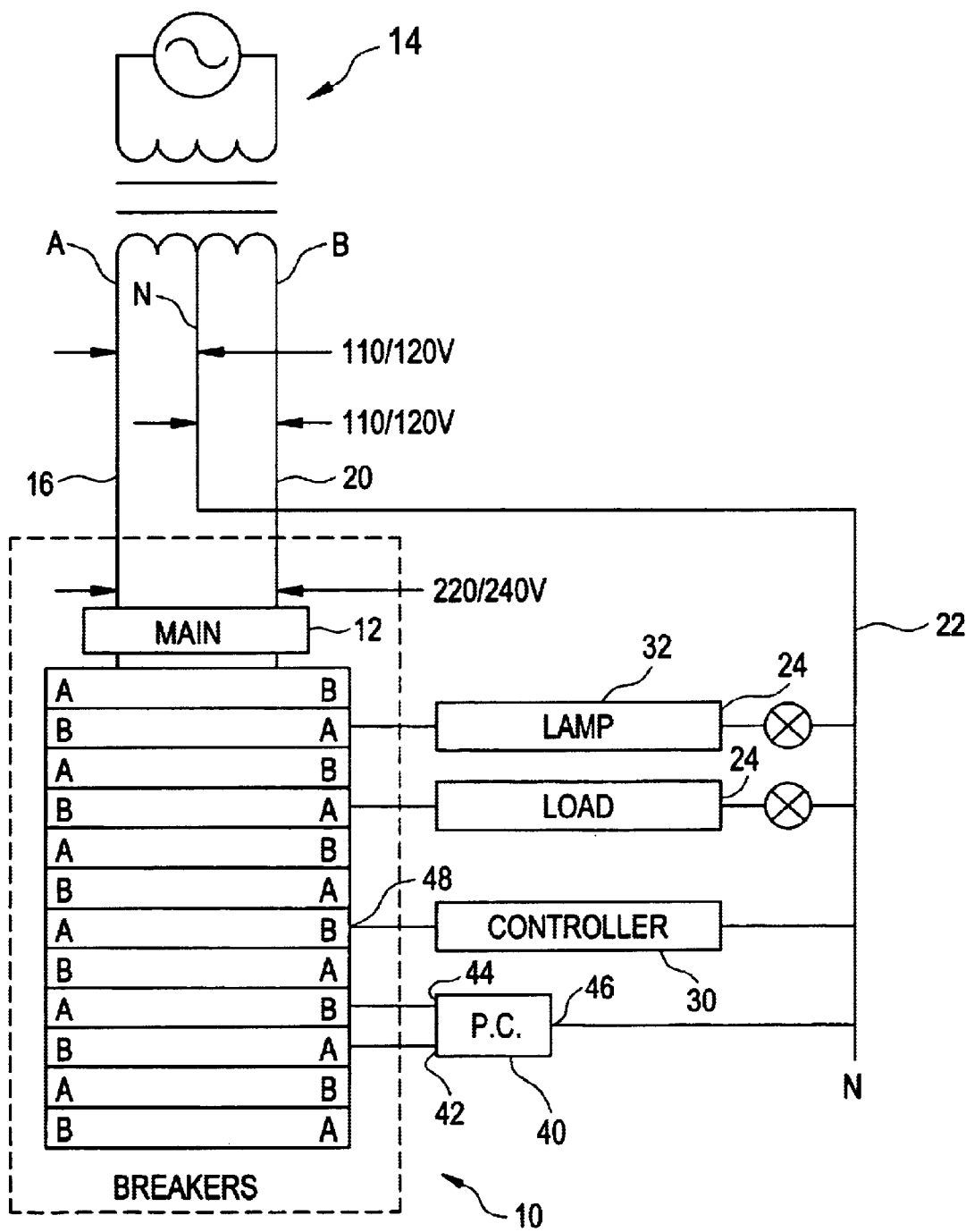
FIG. 2 is a schematic diagram of the conventional automation system of FIG. 1 using the two isolated AC power lines for signal transmission and reception by coupling the two phases with a phase coupler.

Referring to FIG. 2, a schematic of an embodiment of a phase coupler 40 connecting phases A and B for signal operation of loads 24 and signal communication between controllers 30 on either phase A, B is shown. Phase coupler 40 has a first terminal 42 in operable communication with phase A and a second terminal 44 in operable communication with phase B. A third terminal 46 of phase coupler 40 is in operable communication with neutral conductor 22.

First controller 30 is connected with phase B via a branch circuit breaker 48. Phase B is in operable communication with phase A while maintaining the electrical power isolation between the two phases A and B via phase coupler 40. An exemplary embodiment of phase coupler 40 includes a capacitive circuit (e.g., a band pass filter connecting phase A with phase B) that allows signal transmission between the two phases A and B in a frequency range of about 100 kHz to about 400 kHz. In an exemplary embodiment, one such band pass filter is commercially available from Calbrooke Marketing Inc. (CMI) in Canada. In this manner, first controller 30 connected with phase B can communicate with second controller 30 to operate load 24 on phase A, such as lamp 32 with little or no signal attenuation because of the reduced signal path length as a result of phase coupler 40.

Figure 3:
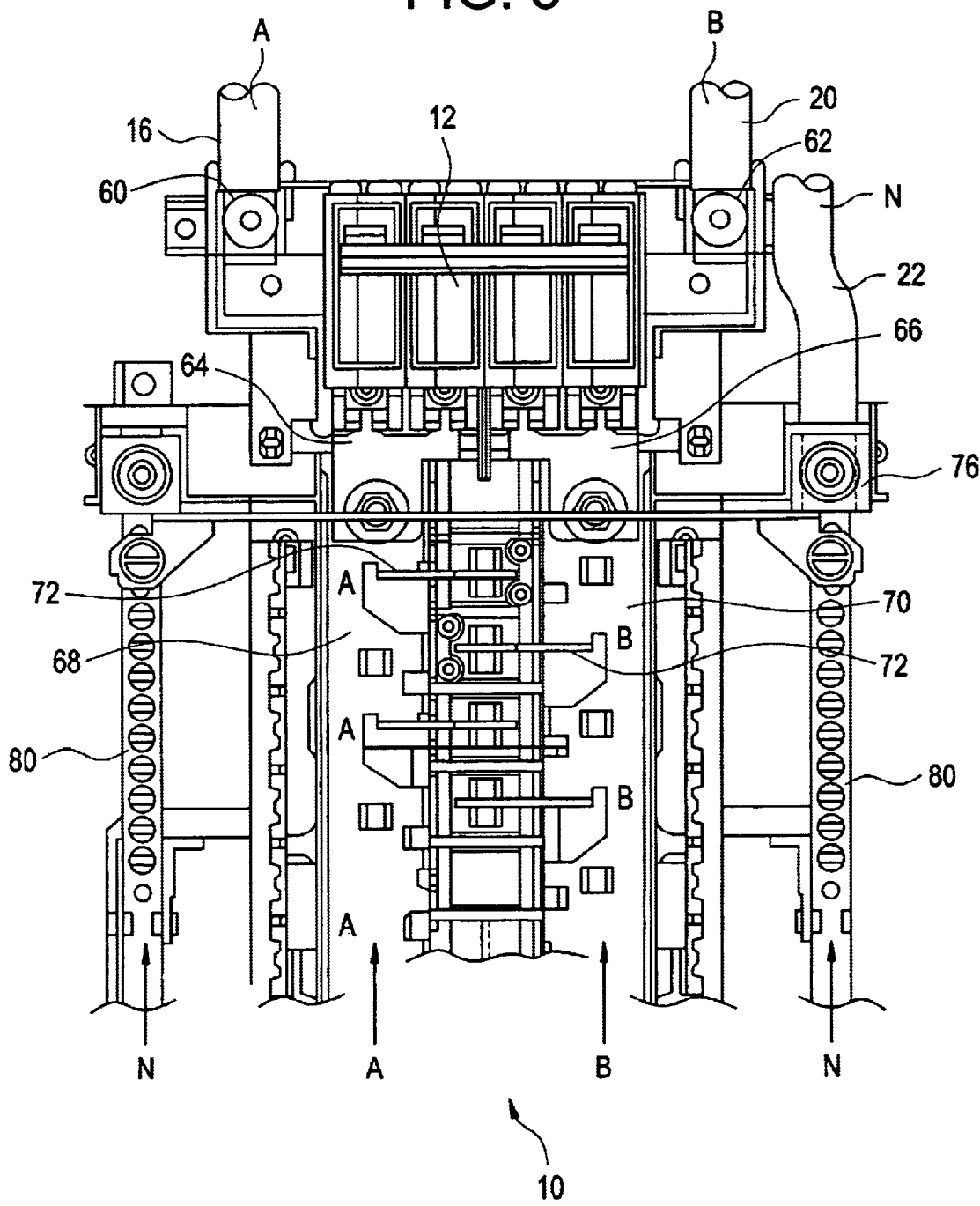
FIG. 3 is partial view of the conductor network for the two isolated AC power lines entering the electrical panel of FIGS. 1 and 2.

Referring to FIG. 3, a partial view of load center 10 in FIG. 2 is illustrated in more detail. Main conductor 16, phase A, connects to a terminal 60 which connects to main circuit breaker 12. Main conductor 20, phase B, connects to another terminal 62 that in turn connects to main circuit breaker 12. Main circuit breaker 12 allows electrical current from conductor 16 to flow through a first terminal 64 representing phase A. Main circuit breaker 12 also allows electrical current from conductor 20 to flow through a second terminal 66 representing phase B. First terminal 64 is mechanically connected to a first bus 68 while second terminal 66 is mechanically connected to a second bus 70. First bus 68 and second bus 70 are generally parallel to each other and generally extend down the length of the load center 10. Each bus 68 and 70 include at least one bus connector 72 extending substantially perpendicular to first and second bus 68, 70 for electrically connecting with a branch circuit breaker (not shown). It can be seen, as it is known, that each bus connector 72 is long enough for connection with two latitudinally abutting branch circuit breakers and that contiguous bus connectors 72 are connected to alternate bus conductors 68 and 70. Neutral conductor 22 connects to a lug 76 connecting a neutral bus bar 80 that is generally U-shaped as it is disposed in load center 10 as seen referring to FIG. 4.

Figure 4:
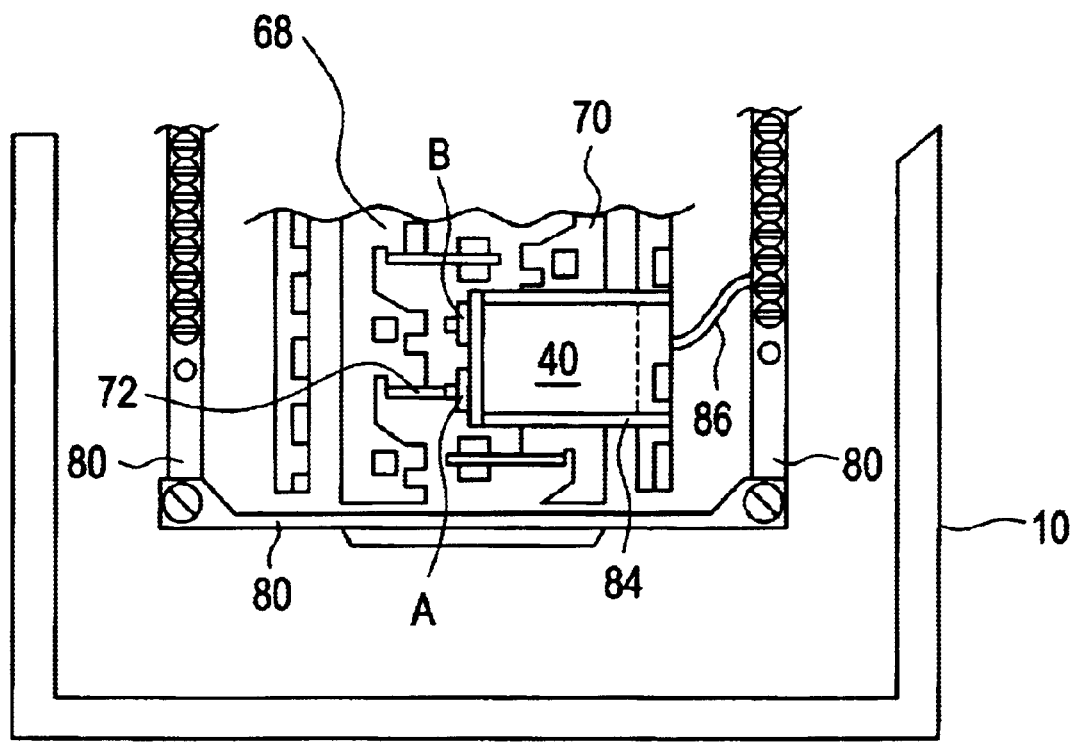
FIG. 4 is a partial view of the electrical panel of FIG. 3 with one embodiment for a phase coupler employed connecting the two isolated AC power lines.

FIG. 4 is a partial view of load center 10 with one embodiment of a phase coupler 40 employed therein to couple phases A and B. Phase coupler 40 includes an electrically insulative housing 84 configured to enclose phase coupler circuitry (not shown) and terminals (not shown) connected thereto for electrically connecting to bus connectors 72 of phase A and B. Housing 84 is optionally configured as a General Electric surge protector, model number THQLSURGE. Phase coupler 40 couples phases A and B through contiguous bus connectors 72 and connects to neutral bus bar 80 via a neutral lead 86 extending from phase coupler 40. Phase coupler 40 connects to load center 10 in the same manner as a double pole circuit breaker connected to phases A and B for overcurrent protection of a 220/240 V load, such as a dryer or oven.

In another exemplary embodiment of phase coupler 40, it is contemplated that surge arrestor circuitry is included with the phase coupling circuitry. The loads and controllers connected to the distribution panel are preferably protected from voltage surges. Surge arrestors suppress voltage surges to a less damaging level by presenting a decrease in impedance upon higher voltages. The resulting low impedance circuit effectively limits surge currents flowing through the distribution panel so that connected electrical devices are not damaged by the surges from other equipment connected to the electrical distribution system or caused by lightening. Surge arrestors are well known in a circuit breaker form or envelope. Thus, phase coupler circuitry and surge arrestor circuitry may be employed in a standard double-pole circuit breaker enclosure that connects to the load center via a plug or bolt style connection.

Figure 5:
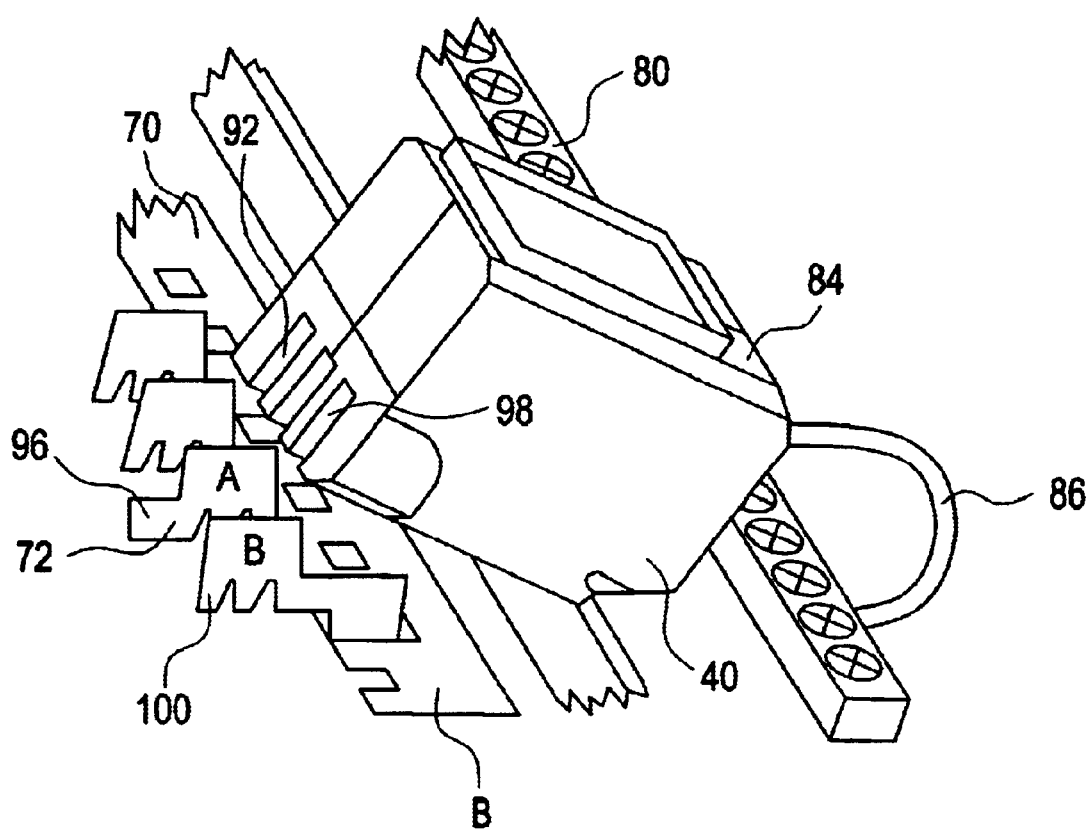
FIG. 5 is a perspective view of the phase coupler of FIG. 4 aligned to connect to two bus connectors associated with the two isolated AC power lines.

Referring now to FIG. 5, a perspective view of the phase coupler 40 shown in FIG. 4 is illustrated. Phase coupler 40 is shown with a neutral lead wire 86 extending therefrom and connected to neutral bar 80. Wire 86 is retained in bar 80 with a threaded fastener 90 or other fastening means, as known in the art. A first terminal 92 is disposed at an opposite end of phase coupler 40 from which wire 84 extends. First terminal 92 is preferably a stab connector for electrically connecting with bus connector 96 for operably connecting to phase A. A second terminal 98 is preferably a stab connector disposed proximate terminal 92 and aligned for electrical connection with bus connector 100 for connection with phase B. First and second terminals 92, 98 are connected via phase coupler circuitry known in the art for allowing signal transmission while isolating electrical power from each phase. Surge arrester circuitry is optionally included with the phase coupling circuitry, as discussed above, for protection against power surges caused by other equipment or lightening. First and second terminals may also be any UL approved connection means for connecting to bus connectors 72. It will be appreciated that phase coupler 40 may be located on either side or in any two contiguous slots in load center 10 for connecting to two different phases of an electrical distribution system, thereby providing signal communication between the two phases for operation of home automation devices connected to the two phases using a communication protocol, including, but not limited to, CEBus, LonTalk, UPnP, Simple Control Protocol (SCP), Homeplug, X-10 protocols to communicate monitoring and control signals to devices connected to either phase. CEBus is a registered trademark of the CEBus Industry Council. LonTalk is a registered trademark and is commercially available from Echelon Corporation. UPnP is a registered trademark and is commercially available from UPnP Implementers Corporation. HomePlug is a trademark of the HomePlug Powerline Alliance, while X-10 is a registered trademark of X-10.

Figure 6:
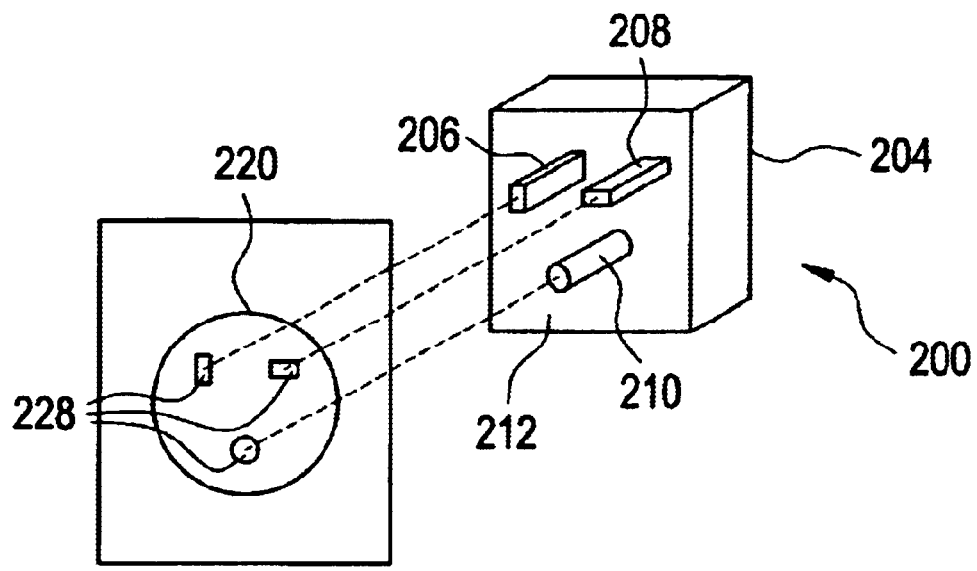
FIG. 6 is a rear perspective view of another embodiment for a phase coupler employed with a 220/240 volt outlet.

Referring now to FIG. 6, an alternative embodiment of the phase coupler 40 connected to a load center 10 in FIG. 2 is shown generally at 200. FIG. 6 is a rear perspective view of phase coupler 200 that is located outside of load center 10 and used for connecting two phases away from load center 10. Phase coupler 200 includes an enclosure 204 for housing phase coupling circuitry contained therein. The circuitry connects to at least three terminals 206, 208 and 210 extending from one side 212 of enclosure 204. Terminals 206, 208 and 210 are configured to be received in a 220/240 V receptacle outlet 220, as known in the art. Terminals 206 and 208 are connected to phases A and B, respectively, while terminal 210 is for connecting with the neutral line 22. Terminals 206, 208 and 210 are configured to be received for electrical connection with a complementary configured receptacle outlet 220 that is common with 220/240 V appliances/devices, such as a dryer or oven.

Figure 7:
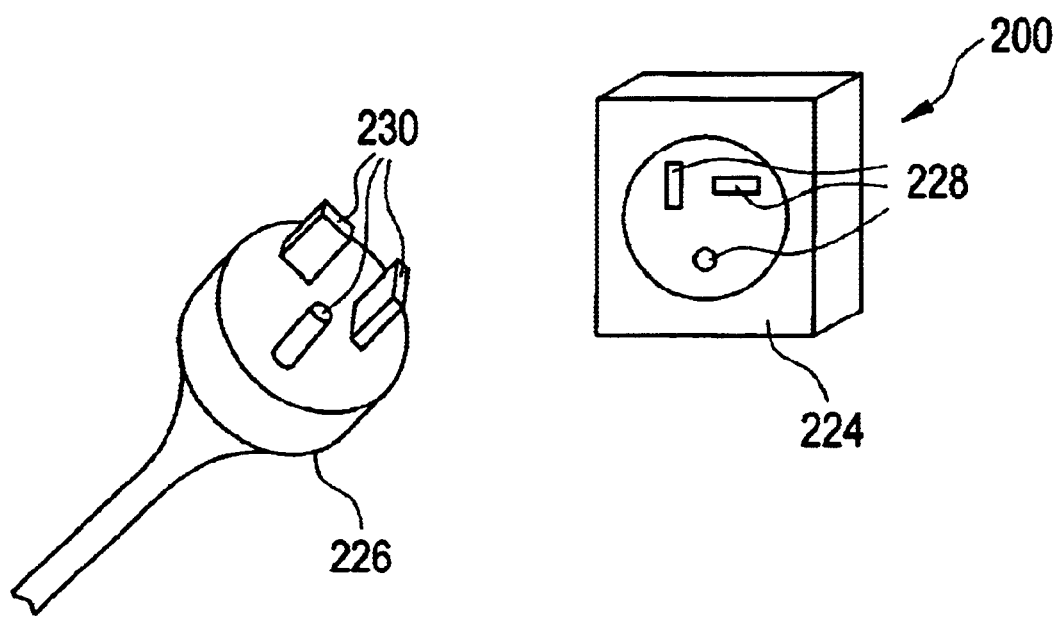
FIG. 7 is a front perspective view of the phase coupler of FIG. 6.

Referring now to FIG. 7, a front perspective view of the phase coupler 200 shown in FIG. 6 is illustrated. A front face 224 of phase coupler 200 is configured generally as outlet 220 shown in FIG. 6 for receiving an electrical plug 226 of a 220/240 V appliance/device (not shown). Front face 224 includes receptacle terminals 228 similarly configured as terminals 228 in outlet 220 for receiving terminals 230 extending from plug 226. Terminals 228 of front face 224 are operably connected to terminals 206, 208, and 210 for providing electrical power from outlet 220.

Phase coupler 200 is received in outlet 220 in place of plug 226. Plug 226 is then received in front face terminals 228 thus providing 220/240 V electrical power to the device while coupling the phases A and B within phase coupler 200 for home automation using a communication protocol with signal transmission and reception on existing AC power lines in a house or building. Phase coupler 200 allows for installation of a phase coupler without having to access the load center 10. It should be noted that it also contemplated that the passive capacitive circuit aforementioned is replaced with an active capacitive circuit to further reduce signal attenuation caused by lengthier power lines in larger buildings.

The phase couplers disclosed herein facilitate coupling of at least two phases for powerline data transfer by eliminating the handling of hot bus bar conductors and allow mounting inside of a load center or plugging into a 220/240 V receptacle. An exemplary phase coupler is UL listed device and is low in cost not necessitating an electrician for its installation. The phase couplers described herein allow electrical products and appliances the ability to use an existing standard electrical system as a data network without regard to how the house or building is wired. The phase couplers described herein allow the requisite need for powerline carrier products to communicate from one phase to the other without using the utility transformer as a bridge for transferring between phases.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A phase coupler for operable communication with a service line within residential or business electrical distribution panel, the phase coupler comprising:
   a housing made of electrically insulating material, the housing having a base adapted for connection with one of the distribution panel and an outlet receptacle;
   at least two high potential terminals being adapted for connection to at least two corresponding high potential lines disposed in one of the electrical distribution panel and said outlet receptacle, each high potential terminal being exposed at said base of housing;
   a low potential terminal being adapted for connecting to a low potential means; and
   a band pass filter circuit being enclosed within said housing and connecting between each high potential terminal and said low potential terminal, said band pass filter circuit configured to transfer a signal having a predetermined frequency or frequency range between said at least two high potential terminals.

2. The phase coupler of claim 1 further including a surge arrestor circuit enclosed within said housing and connecting between each high potential terminal and said low potential terminal.

3. The phase coupler of claim 1 wherein the phase coupler includes:
   a wire lead electrically connecting to the low potential terminal and the low potential means; and
   a pair of contact stabs connecting to each high potential terminal, the contact stabs configured to electrically and mechanically connect to a bus bar.

4. The phase coupler of claim 1 wherein the phase coupler includes:
   a wire lead electrically connecting to the low potential terminal and the low potential means; and
   a pair of contacts connecting to each high potential terminal, the contacts configured to be fastened to a bus bar for mechanical and electrical connection therewith.

5. The phase coupler of claim 1 wherein said base is configured to engage the outlet receptacle and the phase coupler further includes:
   a neutral terminal prong electrically connecting to the low potential terminal and the low potential means, wherein said low potential means is a neutral receptacle terminal of an electrical outlet receptacle; and
   a pair of plug-in terminals connecting to each high potential terminal of said outlet receptacle, the plug-in terminals configured to electrically and mechanically connect to corresponding high potential receptacle terminals of said outlet receptacle.

6. The phase coupler of claim 1 wherein said frequency range is suitable for supporting a communication protocol for control of powerline carrier products over an AC powerline.

7. The phase coupler of claim 1 wherein said predetermined frequency includes a frequency range of about 100 kHz to about 400 kHz.

8. A residential or business multiphase electrical or distribution panel comprising:
   a service line in operable communication with the electrical distribution panel, said service line including at least two high potential lines and a low potential means;
   a plurality of branch circuit breakers connected to at least one of said at least two high potential lines and said low potential means, each of said branch circuit breakers mounted within the electrical distribution panel and in operable communication with a controller;
   a phase coupler configured to transfer a signal from said controller across said at least two high potential lines, the phase coupler comprising:
      a housing made of electrically insulating material, the housing having a base adapted for connection with one of the distribution panel and an outlet receptacle;
      at least two high potential terminals being adapted for connecting to said at least two corresponding high potential lines of the service line disposed in one of the electrical distribution panel and said outlet receptacle;
      a low potential terminal being adapted for connecting to said low potential means; and
      a capacitive circuit connecting said at least two high potential terminals with one another for signal transfer at a predetermined frequency while isolating electrical power between said high potential lines.

9. The multiphase electrical distribution panel of claim 8 wherein the phase coupler further includes a surge arrestor circuit connected to the circuit in operable communication with said at least two high potential terminals and said low potential terminal.

10. The multiphase electrical distribution panel of claim 8 wherein said phase coupler includes:
   a wire lead electrically connecting to the low potential terminal and the low potential means; and
   a pair of contact stabs connecting to each high potential terminal, the contact stabs configured to electrically and mechanically connect to a bus bar.

11. The multiphase electrical distribution panel of claim 8 wherein the phase coupler includes:
   a wire lead electrically connecting to the low potential terminal and the low potential means; and
   a pair of contacts connecting to each high potential terminal, the contacts configured to be fastened to a bus bar for mechanical and electrical connection therewith.

12. The multiphase electrical distribution panel of claim 8 further including a main circuit breaker mounted within the electrical distribution panel, said main circuit breaker receiving current from said service line and distributing said current to said plurality of branch circuit breakers.

13. The multiphase electrical distribution panel of claim 8 wherein said frequency range is suitable for supporting a communication protocol for control of powerline carrier products over an AC powerline.

14. The multiphase electrical distribution panel of claim 8 wherein said predetermined frequency includes a frequency range of about 100 kHz to about 400 kHz.

* * * * *